United States Patent

Andoh et al.

[11] Patent Number: 6,134,071
[45] Date of Patent: Oct. 17, 2000

[54] DISK DRIVE, LOAD/UNLOAD UNIT, AND CONTROL METHOD THEREOF

[75] Inventors: Haruo Andoh, Zama; Keiji Kobayashi, Fujisawa; Yuji Yokoe, Yokohama; Kazunari Tsuchimoto, Sagamihara, all of Japan

[73] Assignee: International Business Machines Corporation, Armonk, N.Y.

[21] Appl. No.: 09/093,963

[22] Filed: Jun. 8, 1998

[30] Foreign Application Priority Data

Jun. 27, 1997 [JP] Japan ........................... 9-171877

[51] Int. Cl.⁷ .................................................. G11B 21/02
[52] U.S. Cl. .............................. 360/75; 714/24; 711/161
[58] Field of Search ......................... 360/75, 69, 60; 714/24; 711/161

[56] References Cited

U.S. PATENT DOCUMENTS

| | | | |
|---|---|---|---|
| 4,757,505 | 7/1988 | Marrington et al. | 714/22 |
| 5,345,347 | 9/1994 | Hopkins et al. | 360/71 |
| 5,715,424 | 2/1998 | Jesionowski | 714/24 |

FOREIGN PATENT DOCUMENTS 2287985   11/1990   Japan ........................... 21/12

*Primary Examiner*—Paul Loomis
*Assistant Examiner*—Dan I. Davidson
*Attorney, Agent, or Firm*—Noreen A. Krall; Robert B. Martin

[57] ABSTRACT

The present invention provides a disk drive, a load/unload unit, and a control method thereof which are capable of reliably unloading a head slider from a disk when power is turned off and enhancing reliability. A disk drive is equipped with a VCM spindle driver for rotating a disk, a magnetic head, an actuator mechanism for moving over the surface of the magnetic disk or to an evacuating position a head slider having the magnetic head, a ramp block, and a CPU/HDC (control means) for performing control of load and unload operations, speed control of the actuator mechanism, and control of an operation of reading or writing data from or to the disk. The CPU/HDC receives a specific command issued from the host immediately before power is turned off, and executes this command, then executes unload control, and notifies the host of command completion after the unload control has been completed.

2 Claims, 2 Drawing Sheets

DISK DRIVE, LOAD/UNLOAD UNIT, AND CONTROL METHOD THEREOF

BACKGROUND OF THE INVENTION

1. Field of the Invention

The present invention relates to a load/unload unit and a control method thereof that are employed in hard disk drives (HDDs), and more particularly to a disk drive, a load/unload unit, and a control method thereof that have a load/unload mechanism by means of which a converter head for reading or writing data from or to a storage medium is loaded onto or unloaded from the storage medium.

2. Description of Related Art

In disk drives, a storage medium such as a magnetic disk is rotated. The rotation of this magnetic disk creates an air bearing that floats a head slider off the disk surface, the slider being mounted on a suspension assembly which constitutes the head arm of an actuator mechanism. With the floated head slider, data is written to or read from the disk. In a non-operative state where rotation of the disk is stopped, the head slider is landed on an evacuating zone, where no data is recorded. A disk drive such as this is referred to as a contact start stop type disk drive.

In the contact start stop type disk drive, there is a danger that the head slider will stick to the surface of a data area or it will be moved to the data area by shock and damage the disk surface. Therefore, with an object of avoiding such danger and enhancing reliability when not operated, a disk drive called a head load/unload type has been developed. A head load/unload type disk drive is equipped with a head load/unload mechanism. The head load/unload mechanism is equipped with a head hold mechanism, which includes a suspension assembly, a head arm and a component called a ramp block provided in the disk drive. When the disk drive is not operated, the head slider is unloaded to an evacuating position without touching the head slider to the disk surface by holding the suspension assembly on the ramp block. The suspension assembly is provided with a tab having a protruding portion. Also, the ramp block is formed with a ramp. The ramp block is disposed so that the ramp is positioned near the outer circumferential portion of the disk. The ramp surface is a combined flat surface having a first inclined surface, a second inclined surface, and a tab-holding flat surface. Note that a horizontal surface (top flat surface) may also be provided between the first inclined surface and the second inclined surface.

When the operation of the disk drive is stopped, the head load/unload mechanism unloads the head slider by rotating the head arm and placing the protruding portion of the tab of the suspension assembly on the tab-holding flat surface of the ramp. When unloading the head slider, the protruding portion of the tab first touches the first inclined surface, then slides on the first and second inclined surfaces, and arrives at the tab-holding flat surface. Also, when the operation of the disk drive is started, the head load/unload mechanism rotates the head arm and loads it over the disk surface being rotated. When loading the head slider, the protruding portion of the tab first slides on the tab-holding flat surface, the second inclined surface, and the first inclined surface and then leaves the first inclined surface.

In the case where power to the disk drive is turned off when the head arm is positioned over the disk surface, the head arm must be quickly evacuated to a predetermined outer circumferential position. However, power to the VCM spindle driver for rotating the head arm is also turned off, and consequently, in order to move the head arm to a predetermined evacuating position, there is only one way to use the back electromotive force of the spindle motor which drives the head arm to rotate on the spindle. That is, the head arm is unloaded by using the back electromotive force of the spindle motor immediately after power is turned off.

However, in the disk drive equipped with a head load/unload mechanism such as that described above, enhancements in reliability in unloading the head arm cannot be achieved, because the head arm is unloaded by the back electromotive force of the spindle motor generated immediately after power is turned off. Since the unloading operation is performed only once by using the back electromotive force, it is possible that the unloading operation will fail due to some situations such as external shock applied to the disk drive.

It therefore can be seen there is a need in the art to provide a disk drive, a load/unload mechanism and a control method thereof which is capable of reliably unloading a head arm when the power to the disk drive is turned off.

SUMMARY OF THE INVENTION

The object of the present invention is to provide a disk drive, a load/unload unit, and a control method thereof which are capable of reliably unloading a head arm when power is turned off and also enhancing reliability.

Briefly stated, the present invention is a disk drive equipped with a load/unload mechanism for loading or unloading a head to or from a storage medium, the head being used for reading or writing data from or to the storage medium. Also, the disk drive is equipped with a controller for controlling operation of the entire disk drive, including load and unload controls. The controller receives a predetermined command which is issued immediately before power is turned off, then executes an operation of the command, and executes the unload control.

A disk drive according to the present invention comprises a load/unload mechanism for loading or unloading a head to or from a storage medium, the head being used for reading or writing data from or to the storage medium. Also, the disk drive is equipped with a controller for controlling operation of the entire disk drive, including load and unload controls, and the controller receives a predetermined command which is issued from a host immediately before power is turned off, then executes an operation of the command, next executes the unload control, and notifies the host of command completion after the unload control has been completed.

The controller may also repeatedly execute the unload control until unloading has been completed. The predetermined command may also be a flush cache command for writing to a hard disk a write command being pended in a cache memory device.

A load/unload unit according to the present invention is equipped with a load/unload mechanism for loading or unloading a head to or from a storage medium, the head being used for reading or writing data from or to the storage medium. In addition, the load/unload unit is equipped with a controller for controlling operation of the entire unit, including load and unload controls, and the controller receives a predetermined command which is issued immediately before power is turned off, then executes an operation of the command, and executes the unload control.

A load/unload unit of the present invention further comprises a load/unload unit equipped with a load/unload mechanism for loading or unloading a head to or from a storage medium, the head being used for reading or writing data from or to the storage medium. Furthermore, the load/unload unit is equipped with a controller for controlling an operation of the entire unit, including load and unload controls, and the controller receives a predetermined command which is issued from a host immediately before power is turned off, then executes an operation of the command, then repeatedly executes the unload control until unloading is completed, and notifies the host of command completion after the unload control has been completed.

A control method according to the present invention comprises a method of controlling a load/unload unit. The load/unload unit is equipped with a load/unload mechanism for loading or unloading a head to or from a storage medium, the head being used for reading or writing data from or to the storage medium. Furthermore, the load/unload unit is equipped with a controller for controlling operation of the entire unit, including load and unload controls. The method comprises the steps of: if a predetermined command, which is issued from a host immediately before power is turned off, is received, executing an operation of the command; repeatedly executing the unload control until unloading is completed; and notifying the host of command completion after the unload control has been completed.

In a disk drive with a load/unload mechanism, a control method according to the present invention comprises a method of controlling an operation of unloading a head from a disk. The method comprises the steps of: receiving a predetermined command from a host; performing an operation associated with the command; unloading the head from the disk; and notifying the host of completion of the predetermined command.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
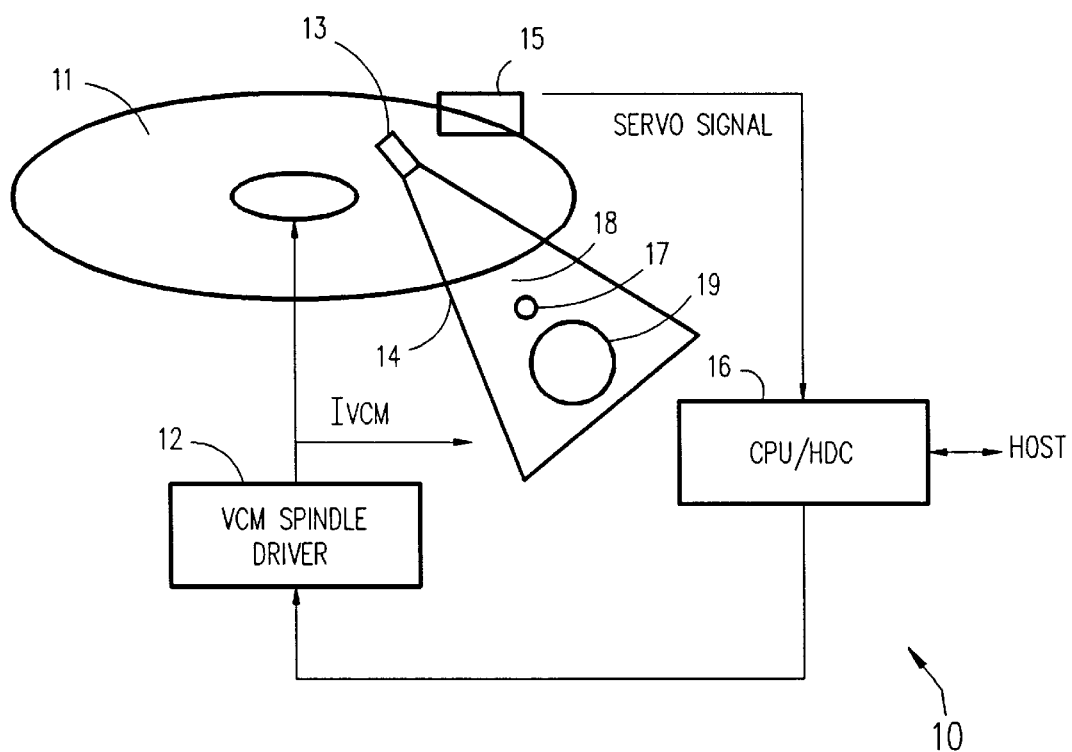
FIG. 1 is a block diagram showing a disk drive according to an embodiment of the present invention.

FIG. 1 is a block diagram showing a disk drive according to an embodiment of the present invention. In FIG. 1 a disk drive 10 is comprised of a disk 11 such as a magnetic disk which is a data storage medium, a VCM spindle driver 12 including a spindle motor (not shown) for rotating the disk 11, a magnetic head 13 for performing reading and writing of data on the disk 11, an actuator mechanism 14 for moving a head slider having the magnetic head 13 over the surface of the magnetic disk 11 or to an evacuating position, a ramp block 15, and a CPU/HDC (control means) 16 for performing control of load and unload operations, speed control of the actuator mechanism 14, and control of an operation of reading or writing data from or to the disk 11. Disk drive 10 is equipped with a head load/unload mechanism, which loads the head slider over the surface of the disk 11 when the operation of the disk drive 10 is started and unloads the head slider from over the disk surface to an evacuating position when the operation is stopped.

The disk 11 is fastened to the rotor portion of the spindle motor. When the disk drive 10 is being operated, the disk 11 is rotated on the spindle of the spindle motor. When the disk drive 10 is in a non-operative state, the disk 11 is at a standstill. On the surface of the disk 11 there are disposed concentric circular tracks, which include a data area on which data is recorded and a servo area on which servo data has been recorded beforehand. On the disk 11 of the disk drive 10, a single or a plurality of disks are mounted.

The VCM spindle driver 12 including the spindle motor for rotating the disk 11 is further comprised of a back electromotive voltage detection circuit for detecting back electromotive voltage.

In the head load/unload mechanism, generally there is not provided a special sensor for sensing the position of the head slider over a ramp or a flat surface and the moving speed. The speed control of the actuator is performed by sensing the back electromotive voltage generated on both ends of the voice coil motor (VCM) coil. More specifically, the actuator, including the VCM, is driven by the VCM drive circuit, but conversely, if this actuator is moved, back electromotive voltage will be generated on both ends of the VCM coil. Therefore, if the back electromotive voltage generated on both ends of the VCM coil is sensed and employed as a control object, the speed control of the head slider will be possible when loaded or unloaded. Accurate detection of the back electromotive voltage which becomes speed control information is indispensable for performing stable speed control.

The actuator mechanism 14 has a head suspension mechanism (not shown), an arm 18 supported so as to be free to rotate on an actuator shaft 17, and a VCM 19 for rotating the arm 18 along the surface of the disk 11. Also, the VCM 19 is driven by a VCM drive circuit (not shown).

When the head slider with the magnetic head 13 is positioned over the magnetic disk 11, a servo signal representing the head position is input to the CPU/HDC 16. Also, in the case where the load and unload controls of the head slider are performed, the back electromotive voltage detected by the back electromotive detection circuit in the VCM spindle driver 12 is input to the CPU/HDC 16.

The ramp block 15 is installed radially outside of the disk 11 and has a plurality of ramps protruding from the side surface in a horizontal direction. The ramp is formed with a recess for stably holding a protruding tab at a position at which the head slider does not touch the outer circumferential portion of the disk 11.

The CPU/HDC 16 is comprised of both a central processing unit (CPU) and hard disk controller (HDC). The CPU performs speed control (ordinary speed control) of the actuator and also performs load and unload controls prior to the speed control. The hard disk controller (HDC) controls the operation of reading or writing data from or to the disk 11, and includes an amplification circuit which amplifies a detection signal such as a position detection signal and a back electromotive voltage detection signal, a waveform shaping circuit, an analog-digital converter (ADC), and a digital-analog converter (DAC). These devices are integrally formed into a single module.

Also, the CPU/HDC 16, when stopping the operation of the disk drive 10, causes a driving current to flow through the voice coil 19 of the actuator mechanism 14 to rotate the arm 18, thereby unloading the head slider from over the surface of the disk 11 to the evacuating position. In addition, when the operation of the disk drive 10 is started, the CPU/HDC 16 causes the arm 18 to rotate to load it over the surface of the disk 11 which began to rotate. Furthermore, based on the servo data read out by the magnetic head 13 of the head slider, the CPU/HDC 16 causes the head slider to move over a desired data track on the disk surface. FIG. 1 shows the state when the head slider is loaded over a desired data track.

The aforementioned CPU is a microprocessor which executes a control program. The CPU is equipped with memory devices for storing a control program and data. Also, the CPU executes processing in accordance with the control program, thereby controlling the entire operation of the HDD, and further controls the operation of the HDC, based on commands and control data supplied from a host.

Particularly, the CPU receives a specific command which is issued from a host immediately before power is turned off. The CPU has a function of executing the command operation, then executing unload control, and notifying a host of command completion after the unload control has been completed.

The operation of the disk drive 10 constructed as described above will hereinafter be described. Initially, a description will be made of the basic concepts of the present invention.

In the hard disk drive with a function of loading or unloading the actuator onto or from the ramp, a specific command is issued from the host immediately before power is turned off, and the CPU/HDC 16 executes this command immediately before power is turned off. As a representation of a command such as this, there is a flush cache command being pended in a cache memory device. The flush cache command is employed for writing a write command to a hard disk. By making use of this fact, if the flush cache command is issued, power will be judged to be in a state immediately before it is turned off, and the CPU/HDC 16 will perform unload control before power is turned off.

In this way, unload control is performed, and the unload control can be performed safely and reliably in comparison with the case where unload control is performed with the back electromotive voltage generated when power is turned off.

Now, the operation of the disk drive 10 will be described in detail based on the aforementioned basic concepts of the present invention.

Figure 2:
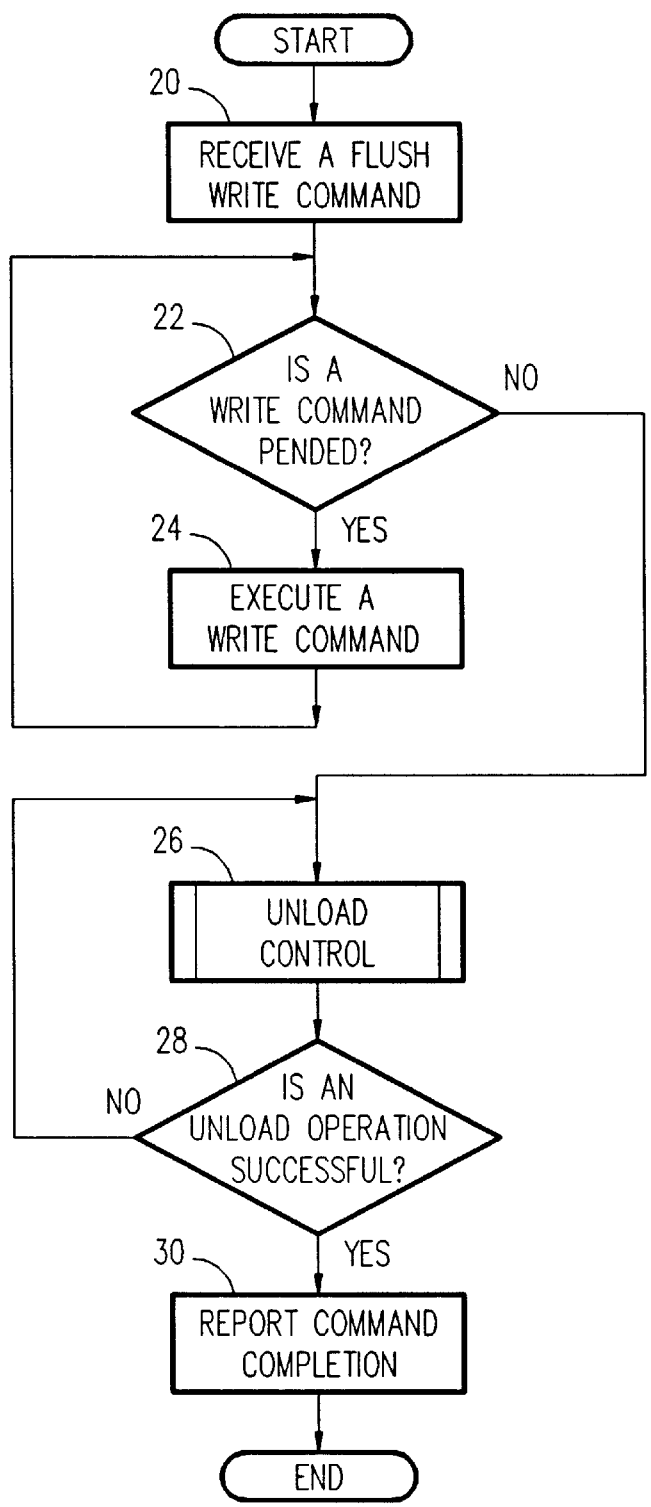
FIG. 2 is a flowchart showing the operation of the unload control of the disk drive.

FIG. 2 is a flowchart showing the operation of unload control and is an example of the case where a flush cache command is employed as a specific command immediately before power is turned off. First, in step 20 if a flush cache command is received, a program will be started. In step 22 it is judged whether or not a write command is pended. When the write command is pended, in step 24 a flush cache command operation for writing the write command to a hard disk is executed and then step 24 returns to step 22. Until the write commands by the flush cache command have been completed, the aforementioned processing is repeated. The foregoing is the original processing that is performed by the flush cache command issued immediately before power is turned off.

When a write command is not pended, it is judged that the processing by the flush cache command has been completed, and step 22 advances to step 26. In step 26, the CPU/HDC 16 performs regular unload control.

Next, in step 28 it is judged whether or not unloading is successful by the unload control performed by the CPU/HDC 16. If unloading is not successful, step 28 will return to step 26. In step 26, unload control is repeated by the CPU/HDC 16 until it succeeds.

When unloading is successful, command completion is reported to the host at step 30, thereby ending the present flow.

As previously described, the disk drive 10 according to this embodiment is equipped with the VCM spindle driver 12 for rotating the disk 11, the magnetic head 13, an actuator mechanism 14 for moving over the surface of the magnetic disk 11 or to the evacuating position the head slider having the magnetic head 13, the ramp block 15, and the CPU/HDC (control means) 16 for performing control of load and unload operations, speed control of the actuator mechanism 14, and control of an operation of reading or writing data from or to the disk 11. The CPU/HDC 16 receives a specific command issued from the host immediately before power is turned off, and executes this command operation, then execute unload control, and notifies the host of command completion after the unload control has been completed. Therefore, unloading of the head can be reliably executed under conditions controlled by the unload control performed by the CPU/HDC 16, and the reliability of unloading the head can be enhanced.

Therefore, if unloading failed once, it would be sufficient if the aforementioned unload control is repeated many times, and the unload operation can be reliably performed. Also, after the unload control according to this embodiment, as with the conventional example, unloading is performed by using back electromotive voltage, whereby loading may be reliably performed.

In addition, in this embodiment, since the flush cache command has an unload function, a new change such as addition of a command does not occur in the host side for load and unload operations. Therefore, an enhancement in reliability is achievable without changing hardware.

In this embodiment, while a flush cache command has been employed as a predetermined command which is issued immediately before power is turned off, other commands which can have a similar function, such as a Seek command, an Identify Device command, a Soft Reset command, a Check Power Mode command, and an Invalid command, may also be employed.

In addition, in the aforementioned embodiment, although the present invention has been applied to a HDD, the invention is not limited to this, but it is applicable to any drive if it is a disk drive with a load/unload mechanism. It is a matter of course that the present invention may also be employed in a load/unload unit, and similar advantages as the aforementioned embodiments are obtainable.

Furthermore, it is a matter of course that the type of the CPU/HDC and the load/unload mechanism constituting the aforementioned drive disk and the number of CPU/HDCs and load/unload mechanisms are not limited to the aforementioned embodiment.

The disk drive, the load/unload unit, and the control method, according to the present invention, are equipped with a load/unload mechanism and means for controlling an operation of the entire device, including load and unload controls. The control means receives a predetermined command which is issued immediately before power is turned off, then executes an operation of the command, and executes the unload control. Therefore, unloading can be reliably executed and reliability can be enhanced.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A disk drive comprising:

a load/unload mechanism for loading or unloading a head to or from a storage medium, the head being used for reading or writing data from or to said storage medium; and a controller for controlling an operation of the entire disk drive, including load and unload controls; wherein said controller receives a predetermined command which is issued from a host immediately before power is turned off, then executes an operation of said command, next executes the unload control, and notifies said host of completion of said command after said unload control has been completed.

2. In a disk unit with a load/unload mechanism, a method of controlling an operation of unloading a head from a disk comprising the steps of:

receiving a predetermined command from a host;

performing an operation associated with said command;

unloading said head from said disk; and notifying said host of completion of said predetermined command.

* * * * *